United States Patent
De Ruiter et al.

(10) Patent No.: US 12,404,841 B2
(45) Date of Patent: Sep. 2, 2025

(54) DEVICE, SYSTEM AND METHOD FOR FORMING A TEMPORARY SUPPORT STRUCTURE FOR MAINTENANCE CREW FOR A BLADE OF A WIND TURBINE, METHOD OF PERFORMING MAINTENANCE, WIND TURBINE BLADE, WIND TURBINE AND WIND TURBINE PARK

(71) Applicant: Ampelmann Holding B.V., Delft (NL)

(72) Inventors: Adrianus Huibert De Ruiter, Delft (NL); Jan Van Der Tempel, Delft (NL)

(73) Assignee: Ampelmann Holding B. V., Delft (NL)

( * ) Notice: Subject to any disclaimer, the term of this patent is extended or adjusted under 35 U.S.C. 154(b) by 12 days.

(21) Appl. No.: 18/032,462

(22) PCT Filed: Oct. 29, 2021

(86) PCT No.: PCT/NL2021/050663
§ 371 (c)(1),
(2) Date: Apr. 18, 2023

(87) PCT Pub. No.: WO2022/093027
PCT Pub. Date: May 5, 2022

(65) Prior Publication Data
US 2023/0383732 A1    Nov. 30, 2023

(30) Foreign Application Priority Data
Oct. 30, 2020   (NL) ...................................... 2026805

(51) Int. Cl.
F03D 80/50   (2016.01)
(52) U.S. Cl.
CPC ................................ F03D 80/502 (2023.08)

(58) Field of Classification Search
CPC .... F03D 80/50; F03D 80/502; F05B 2230/50; F05B 2230/80
See application file for complete search history.

(56) References Cited

U.S. PATENT DOCUMENTS

| 10,352,062 B2 | 7/2019 | Fletcher |
| 2014/0202002 A1 | 7/2014 | Anasis et al. |

(Continued)

FOREIGN PATENT DOCUMENTS

| DE | 102010011365 A1 | 9/2011 |
| EP | 2700811 A1 | 2/2014 |

(Continued)

OTHER PUBLICATIONS

International Search Report and Written Opinion—PCT/NL2021/050663—mailing date May 5, 2022.

*Primary Examiner* — Nathaniel E Wiehe
*Assistant Examiner* — Maxime M Adjagbe
(74) *Attorney, Agent, or Firm* — Banner & Witcoff, Ltd.

(57) ABSTRACT

Device for forming a temporary support structure for maintenance crew for a blade of a wind turbine, the device comprising a sleeve configured to surround the blade, at least a longitudinal section thereof, wherein the sleeve comprises at least one inflatable part which is changeable between a deflated state and an inflated state when the sleeve surrounds the blade, wherein in the deflated state the sleeve is movable with respect to the blade for positioning the sleeve with respect to the blade, wherein in the inflated state the sleeve is configured to clamp the sleeve with respect to the blade, wherein, at least in the inflated state, the sleeve is configured to form a support structure along the blade for supporting maintenance crew for the blade thereon.

20 Claims, 6 Drawing Sheets

(56) References Cited

U.S. PATENT DOCUMENTS

2015/0204193 A1* 7/2015 Anasis .................... F03D 80/50
                                                          29/889.1
2020/0158091 A1   5/2020 Sen et al.

FOREIGN PATENT DOCUMENTS

| EP | 3027900 A1 | 6/2016 |
| ES | 2533277 A1 | 4/2015 |
| WO | 2007/033671 A1 | 3/2007 |
| WO | 2018/065639 A1 | 4/2018 |
| WO | 2018/113875 A1 | 6/2018 |
| WO | 2019/001660 A1 | 1/2019 |
| WO | 2019/155234 A1 | 8/2019 |
| WO | 2020/002278 A1 | 1/2020 |

* cited by examiner

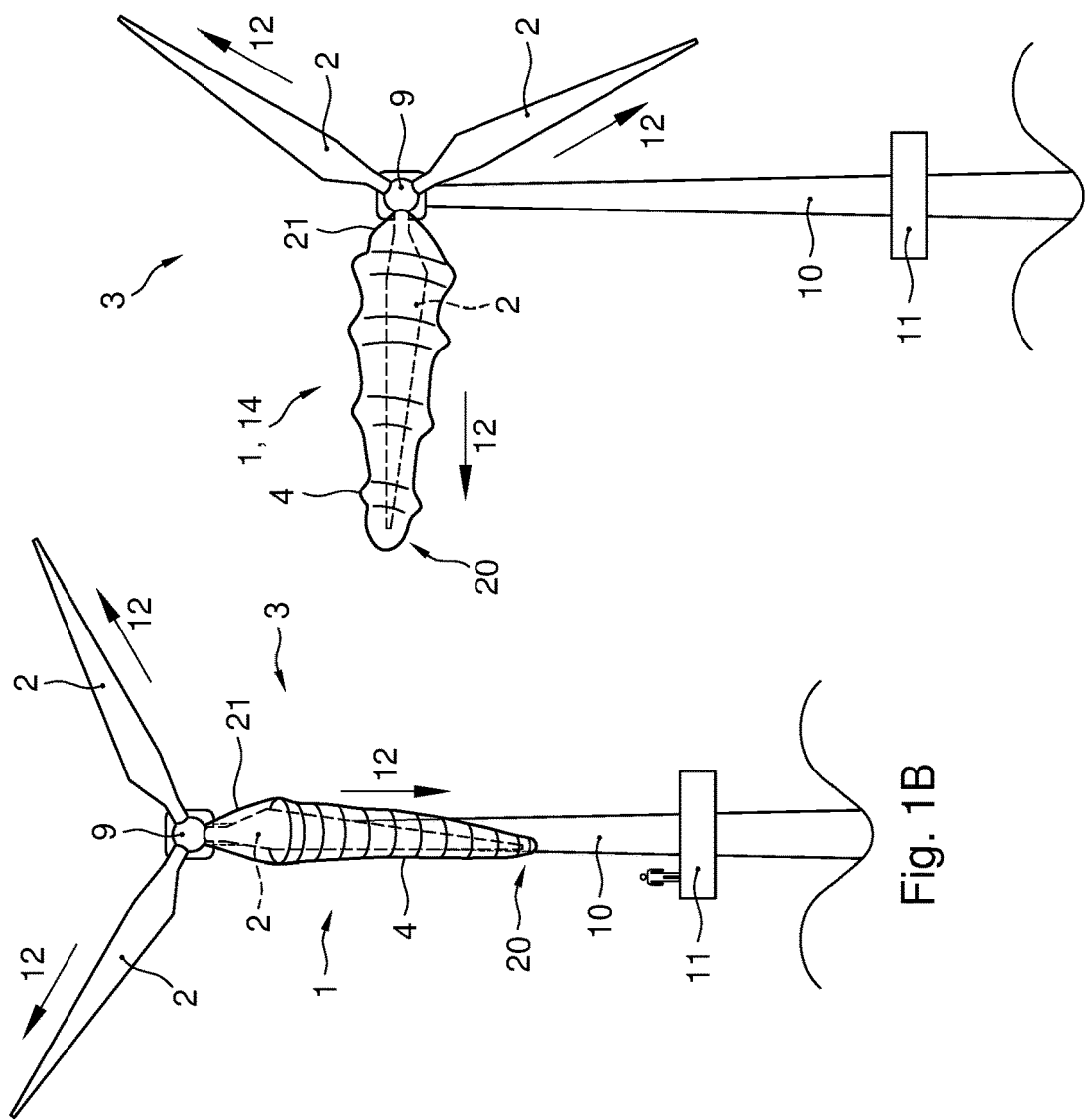
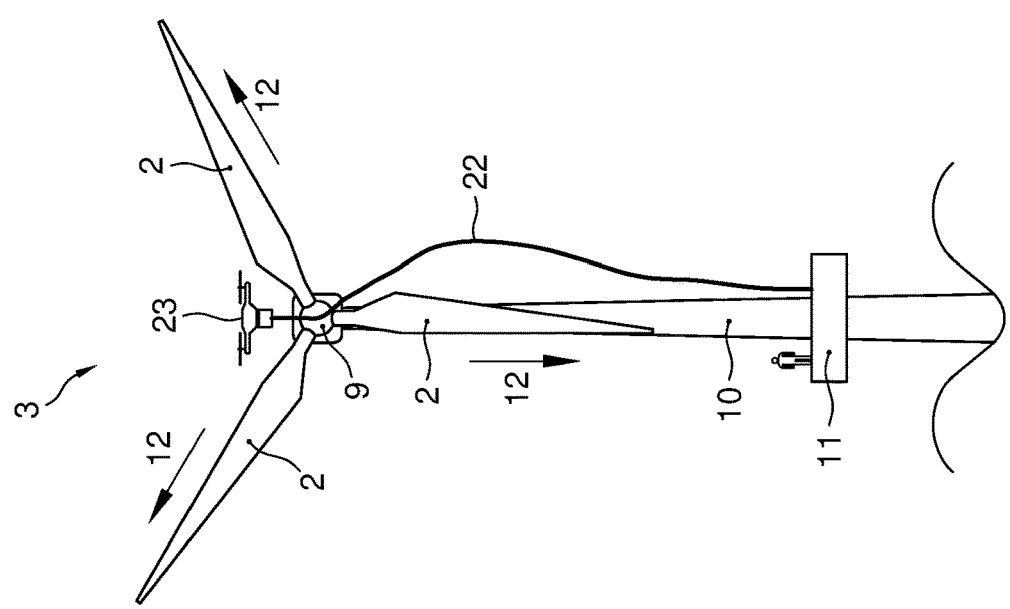
Fig. 1A  Fig. 1B  Fig. 1C

DEVICE, SYSTEM AND METHOD FOR FORMING A TEMPORARY SUPPORT STRUCTURE FOR MAINTENANCE CREW FOR A BLADE OF A WIND TURBINE, METHOD OF PERFORMING MAINTENANCE, WIND TURBINE BLADE, WIND TURBINE AND WIND TURBINE PARK

CROSS-REFERENCE TO RELATED APPLICATIONS

This application is a U.S. National Stage application under 35 U.S.C. § 371 of International Application PCT/NL2021/050663 (published as WO 2022/093027 A1), filed Oct. 29, 2021 which claims the benefit of priority to Application NL 2026805, filed Oct. 30, 2020. Benefit of the filing date of these prior applications is hereby claimed. Each of these prior applications is hereby incorporated by reference in its entirety.

The invention relates to a device for forming a temporary support structure for maintenance crew for a blade of a wind turbine. The invention also relates to a system for forming such a temporary support structure and to a method of forming such a temporary support structure. The invention also relates to a method of performing maintenance on a blade of a wind turbine. The invention also relates to a wind turbine blade, to a wind turbine and to a wind turbine park.

A device for forming a temporary support structure for maintenance crew for a blade of a wind turbine is known as such from various examples. Such a device can be used to enable maintenance crew to perform maintenance on a wind turbine blade, in particular while the blade remains connected to a nacelle of the wind turbine, i.e. typically at considerable height above ground level.

Blades of wind turbines tend to get damaged and soiled over time, in particular by precipitation such as rain and hail, especially when operating at relatively high speeds. Frequent maintenance such as repairs and cleaning is therefore required to maintain sufficiently high performance levels of wind turbines. Such maintenance generally requires maintenance crew to handle the blade from the outside, which can be challenging.

Without such a device, either the maintenance crew would have great difficulty in accessing the blade at height, possibly facing serious safety risks, or the blade would have to be taken down from the turbine for maintenance, to be reinstalled afterwards. The latter option, while relatively safe for maintenance crew, is time consuming and costly, especially in the case of offshore wind turbines, which are generally more difficult to access compared to land based wind turbines.

As one example of a known device, WO2019/001660A1 discloses an air ship. The airship is arranged to house, i.e. enclose, at least a portion of a wind turbine blade such that a longitudinal axis of the blade is substantially parallel to a longitudinal axis of the airship. A front section of the airship presents an opening configured for introducing the blade into the airship in a direction towards a rear section of the airship. The airship comprises a workshop for maintenance and/or repair of the blade. In an associated method, maintenance and/or repair of the blade is performed while the blade is mounted to a rotor hub of the wind turbine and at least partly located inside the air ship.

Operating an air ship in such close proximity to a wind turbine, for example within a wind turbine park, generally incurs considerable safety risks. To address these, first of all neighboring wind turbines in the park would need to be taken out of operation temporarily, which would negatively affect energy yield. Also, as the air ship approaches the wind turbine, it would have to be maneuvered more and more slowly to avoid a collision. Provision of the temporary support structure in this way would thus be a risky and time consuming process, wherein navigating the air ship to mate safely with the turbine blade would require great skill. Moreover, air ships are relatively expensive to produce and operate.

An another example, WO2007/033671A1 discloses a wind turbine comprising at least one attachment device for attaching servicing equipment such as working platforms, which attachment device is attached at and is accessible from the blade exterior. In an associated method, the blade is serviced wherein safety lines for crew, a covering tent or a working platform are attached to at least one attachment device in the blade.

Such an attachment device would generally have to be installed on the blade at the time of manufacturing the blade, at least prior to mounting the blade to the nacelle. Thus, existing wind turbines cannot be serviced in this way without first replacing the blades. Also, safely attaching equipment such as a working platform to such an attachment device can be challenging, in particular in less than ideal weather conditions.

An object of the present invention is to provide an improved device for forming a temporary support structure for maintenance crew for a blade of a wind turbine. It is a further object to provide a device for forming a temporary support structure for maintenance crew, the device enabling safer, easier, faster, and/or less costly maintenance of a wind turbine blade, and/or which device is more universally usable.

Thereto, according to an aspect of the invention, a device is provided for forming a temporary support structure for maintenance crew for a blade of a wind turbine. The device comprises a sleeve configured to surround the blade, at least a longitudinal section thereof. The sleeve comprises at least one inflatable part which is changeable between a deflated state and an inflated state when the sleeve surrounds the blade.

In the deflated state, the sleeve is movable with respect to the blade for positioning the sleeve with respect to the blade. In the inflated state, the sleeve is configured to clamp the sleeve with respect to the blade.

At least in the inflated state, the sleeve is configured to form a support structure along the blade for supporting maintenance crew for the blade thereon.

Such a device enables safer, easier, faster, and/or less costly maintenance of a wind turbine blade, in particular by being relatively easy and safe to install and remove with respect to the blade, while providing good access to the blade for maintenance crew while at the same time contributing to good crew safety. As no special provisions such as anchor points are required on the blade itself, the device is usable for a large variety of blades including blades which have already been installed. The device can be installed and removed e.g. from a base and/or nacelle of the turbine, optionally with help of a relatively small aerial vehicle for initial positioning of a hoist wire. No complex maneuvering of large air ships is needed.

In the context of the present disclosure, a temporary support structure can be understood as a support structure which is provided at the blade for maintenance purposes around the time that maintenance is performed, in particular when the wind turbine is not operational for wind energy conversion. After maintenance has completed and before normal operation of the turbine is resumed, the temporary support structure is removed from the blade.

In the context of the present disclosure, maintenance crew can include one or more human, (non-human) animal and/or robotic maintenance crew such as maintenance robots, either alone or in any combination. In the context of the present disclosure, maintenance can for example comprise repair work and/or cleaning work, wherein maintenance crew refers to crew who carry out such work.

A wind turbine can be understood as a turbine which harvests wind energy and converts it to another form of energy such as electricity, hydraulic energy and/or chemical energy. A wind turbine can be located offshore on land, for example. A wind turbine can be arranged in a wind turbine park or be stand-alone.

A blade of a wind turbine generally extends from a proximal end thereof which is connected, at least connectable, to a nacelle of the wind turbine, to a distal end or tip of the blade, along a main longitudinal blade axis. A longitudinal section of the blade can thus be understood being defined substantially by two mutually different positions along the longitudinal axis.

In the context of the present disclosure a sleeve can be open-ended or have a closed end such as a closed distal end, i.e. a bag-like or pouch-like structure. Preferably the sleeve is at least partly flexible in the deflated state, wherein the sleeve may comprise one or more less or not flexible parts.

An inflatable part can be understood as a part in which air or another fluid, preferably a gas, can be introduced under pressure so that the part is distended by the fluid pressure. Inflatability can be realized through use of a suitable distendable, e.g. flexible, material, for example with a dedicated inflation opening or connection therein, for example with a valve to prevent a back flow of pressurized fluid.

Clamping the sleeve with respect to the blade can for example be realized by dimensioning and/or inflating the sleeve such that in the inflated state an inner circumference of the sleeve is pressed against the blade by the fluid pressure associated with the inflating. Thereto the at least one inflatable part may partly or fully surround the blade during use, but that is not strictly necessary. As an alternative, the at least one inflatable part may be arranged only on one side of the blade, wherein inflation thereof pulls an adjacent and/or opposite non-inflated part against the blade, thereby clamping the blade, in particular clamping between the inflated and non-inflated parts.

In the context of the present disclosure, a support structure for supporting maintenance crew thereon can be understood as a structure on which maintenance crew can stand, sit and/or lie, either with or without also being (partially) directly supported by the blade itself. Thus the support structure can form a platform or a part thereof, for example. Highly preferably, the support structure is configured to support at least one human maintenance worker thereon, at least in the inflated state.

The support structure can advantageously comprise a platform for the maintenance crew which platform substantially extends along the blade, in particular extending at an angle to a face of the blade, preferably at a distance from a leading edge of the blade. Such a face can refer to a so called upper surface or a so called lower surface of the blade, i.e. a surface which extends between a leading edge and a trailing edge of the blade. During use, the platform may be arranged immediately adjacent to, e.g. in contact with, said face of the blade. Alternatively the platform may extend at a distance from said face, wherein for example the platform is suspended underneath a downwardly directed leading edge, at some distance therefrom. The sleeve may be configured to provide the support structure when the blade extends substantially horizontally. During use, the sleeve may first be positioned onto the blade when the blade extends non-horizontally such as substantially downwardly, whereafter the blade is rotated to a substantially horizontal orientation by a rotation about the wind turbine axis. In this example the wind turbine has a substantially horizontal axis, i.e. as in a common type of wind turbine wherein the blades rotate within a substantially vertical plane.

In this way maintenance crew can move longitudinally along the blade relatively easily, in particular without climbing or adjusting the provided support structure.

In another preferred embodiment, the platform extends substantially transverse to the blade. Also, the support structure may comprise a multiple number of platforms arranged in parallel with each other and substantially transverse to the blade. Then, the sleeve may be configured to provide the support structure when the blade extends substantially vertically having several advantages including reduction in assembling time and cost reduction.

Preferably, the sleeve comprises a first sleeve channel and a second sleeve channel substantially parallel to each other, wherein the first sleeve channel is configured to receive at least a section of the blade therein, wherein the second sleeve channel is configured to receive the maintenance crew therein.

The support structure may be configured to provide fall protection for the maintenance crew on the support structure. Thereto the support structure for example comprises a barrier and/or an anchoring means.

The support structure is preferably configured to enable the maintenance crew to move, for example walk and/or crawl, thereon with respect to the blade, in particular along a longitudinal direction in which the blade extends.

Highly preferably, the support structure is configured to provide an enclosure for the maintenance crew, in particular an enclosure within the sleeve, for example in the second sleeve channel, and/or an enclosure between the sleeve and the blade. During use preferably at least a section of the blade is exposed within the enclosure for maintenance of the at least section of the blade from within the enclosure.

Such an enclosure can provide several advantages.

Firstly, the enclosure can provide, at least contribute to, fall protection for the maintenance crew. In particular, the enclosure can enable maintenance crew to work and move therein relatively safely and efficiently, i.e. with a relatively good maneuverability of crew and tools yet with relatively little risk of falling. It will be understood that crew and/or tools may nevertheless be additionally secured to the wind turbine and/or the device, e.g. using a line, harness and/or anchor.

Furthermore, such an enclosure can advantageously shield maintenance crew and tools from environmental conditions such as weather conditions. The enclosure and/or parts thereof may be substantially weather proof, for example wind proof and/or water proof. In an embodiment, the enclosure is configured to control environmental conditions in the enclosure, for example passively and/or actively.

By exposing at least a section of the blade within the enclosure, maintenance crew in the enclosure can safely and conveniently access that at least section for maintenance while remaining in the enclosure.

Thus, to enable maintenance on the blade which is received in the first sleeve channel from within the second sleeve channel, in particular maintenance of one or more sections of a leading edge of said blade, the sleeve may provide at least one window, i.e. at least one through opening, between the first and second sleeve channels.

The support structure is preferably configured to provide an entrance into the enclosure for the maintenance crew, in particular an entrance from a proximal section or end of the blade. The first and second sleeve channels may thereto have respective proximal entrances, i.e. one entrance for the blade and one entrance for the maintenance crew, for example substantially adjacent to each other. One or more of the entrances, in particular an entrance for the maintenance crew, may be closeable, to enhance fall protection and/or environmental protection at the entrance when the maintenance crew is in the enclosure. Closeability may be provided by a door or hatch, e.g. made from the same material as an inflatable part of the sleeve, e.g. using a zip or similar device as a closing mechanism.

The at least one inflatable part may be realized and configured in various ways.

Preferably, the at least one inflatable part comprises at least one inflatable rib part which is configured to stiffen the sleeve, at least a section thereof, when inflated.

Such an inflatable rib part can provide a relatively stable structure, e.g. for clamping the blade and/or for forming the support structure, in particular while allowing access between the at least one rib part for maintenance and/or maneuvering.

Preferably, the at least one inflatable part comprises a series of inflatable rings which are each configured to surround the blade and to clamp the blade when inflated. The inflatable rings are for example distributed along a longitudinal direction in which the blade extends. In particular, the inflatable rings can be arranged with mutual interspacing along the sleeve to expose one or more sections of the blade between the rings for maintenance of said one or more sections.

In this way a relatively stable clamping of the blade along a relatively long longitudinal section of the blade can be realized while good access to the blade is provided between the rings.

The at least one inflatable part preferably comprises at least one inflatable connecting part which is configured to expand and/or stiffen a section of the sleeve which section mutually connects at least two adjacent inflatable rings.

Thus the sleeve can be well stabilized in the longitudinal direction.

In an embodiment, the rings are respectively dimensioned in accordance with a respective dimension of the blade at a predetermined operational position of the ring along the blade.

A good clamping fit along the blade, and thereby a stable support structure at the blade, can thereby be realized. Such dimensioning of the rings can be realized in various ways, for example by a dimensioning or of a section of sleeve material, by controlling (e.g. passively or actively) an inflation level at the ring, and/or by constraining a shape or dimension of the ring, for example by an adjustable constraint.

In an embodiment, the sleeve has a constricted and/or closed distal end which is configured to receive a tip of the blade therein.

Such a constricted and/or closed end can provide a close fit of the sleeve at said end, thereby contributing to stability. Moreover such an end can inhibit that the sleeve end is drawn too far towards the proximal blade end, for example by a hoisting line and/or by a sleeve connection at the proximal end.

In an embodiment, the device further comprises anchoring means for anchoring the sleeve, in particular a proximal end of the sleeve, with respect to the blade, for example anchoring to a proximal section or end of the blade and/or to a nacelle from which the blade extends.

In this way a position of the proximal sleeve end along the longitudinal blade axis can be well controlled. The sleeve may be anchored, e.g. suspended from the nacelle, while the blade is directed substantially downward, whereafter the anchored blade is rotated to a substantially horizontal orientation.

A further aspect of the invention provides a system for forming a temporary support structure for maintenance crew for a blade of a wind turbine. The system comprises a device as described herein for forming a temporary support structure for maintenance crew for a blade of a wind turbine. The system comprises positioning means for positioning the sleeve of said device with respect to the blade, in particular when the sleeve is in the deflated state.

Such a system provide above mentioned advantages, wherein the sleeve can be positioned towards, along and/or away from the blade using the positioning means.

The positioning means may comprise hoisting means for hoisting the sleeve with respect to the blade. The hoisting means may comprise a hoist wire. The hoisting means may comprise an aerial vehicle such as an unmanned aerial vehicle (UAV) for positioning the or a hoist wire for hoisting the sleeve.

The system may further comprise inflating means, for example a pump such as an air pump, for inflating the sleeve on the blade.

The system may further comprise monitoring means for monitoring the inflated state of the sleeve, in particular for monitoring whether the sleeve is sufficiently inflated and/or whether a leak may be present in the at least one inflatable part.

The system may further comprise a guiding means for guiding the sleeve and the blade with respect to each other to receive the blade in the sleeve. In particular, such a guiding means may facilitate a smooth insertion of a tip of the blade into a proximal entrance of the sleeve, for example by causing the proximal entrance to be in an open state for receiving the blade tip.

A further aspect provides a method of forming a temporary support structure for maintenance crew for a blade of a wind turbine. The method comprises: providing a device as described herein for forming a temporary support structure for maintenance crew for a blade of a wind turbine, optionally as part of a system as described herein; positioning the sleeve to surround at least a section of the blade; and inflating the at least one inflatable part, thereby clamping the sleeve with respect to the blade.

Such a method provides above mentioned advantages.

Preferably, the method further comprises bringing the blade to a substantially horizontal position, for example from a more downwardly directed position, in particular after positioning the sleeve to surround at least a section of the blade, for example before inflating the at least one inflatable part.

Preferably, the method further comprises anchoring the sleeve, in particular a proximal end thereof, with respect to the blade, for example anchoring to a proximal section or end of the blade and/or to a nacelle from which the blade extends.

A further aspect provides a method of performing maintenance on a blade of a wind turbine, the method comprising: forming at the blade a temporary support structure by a method as described herein and/or using a device as described herein and/or using a system as described herein; and performing maintenance on the blade from the formed support structure.

Such a method enables safer, easier, faster, and/or less costly maintenance of a wind turbine blade.

Preferably, the method further comprises removing the temporary support structure from the blade after maintenance has been performed from the support structure, wherein the removing in particular comprises deflating the sleeve, thereby releasing the clamping of the sleeve with respect to the blade.

Further aspects of the present invention provide: a wind turbine blade provided with a device and/or a system as described herein and/or maintained by a method as described herein; a wind turbine, in particular offshore wind turbine, comprising said wind turbine blade; and a wind turbine park, in particular offshore wind turbine park, comprising a plurality of wind turbines, said plurality including at least said wind turbine comprising said blade.

Such a blade, wind turbine and park benefit from above mentioned advantages and are thus particularly safe, easy, fast and/or less costly to maintain.

In the following, the invention will be elucidated further using exemplary embodiments and drawings. The drawings are schematic and merely show examples. In the drawings, similar or corresponding elements have been provided with similar or corresponding reference signs. In the drawings:

FIG. 1A shows a front view of an exemplary wind turbine, wherein a hoist line is positioned using an unmanned aerial vehicle;

FIG. 1B shows a front view the wind turbine of FIG. 1A, wherein a downwardly directed blade of the wind turbine is provided with an exemplary device for forming a temporary support structure, wherein a sleeve of the device is in a deflated state;

FIG. 1C shows a front view the wind turbine of FIG. 1B, wherein the blade has been rotated to a horizontal position and wherein the sleeve is in an inflated state;

Figure 2:
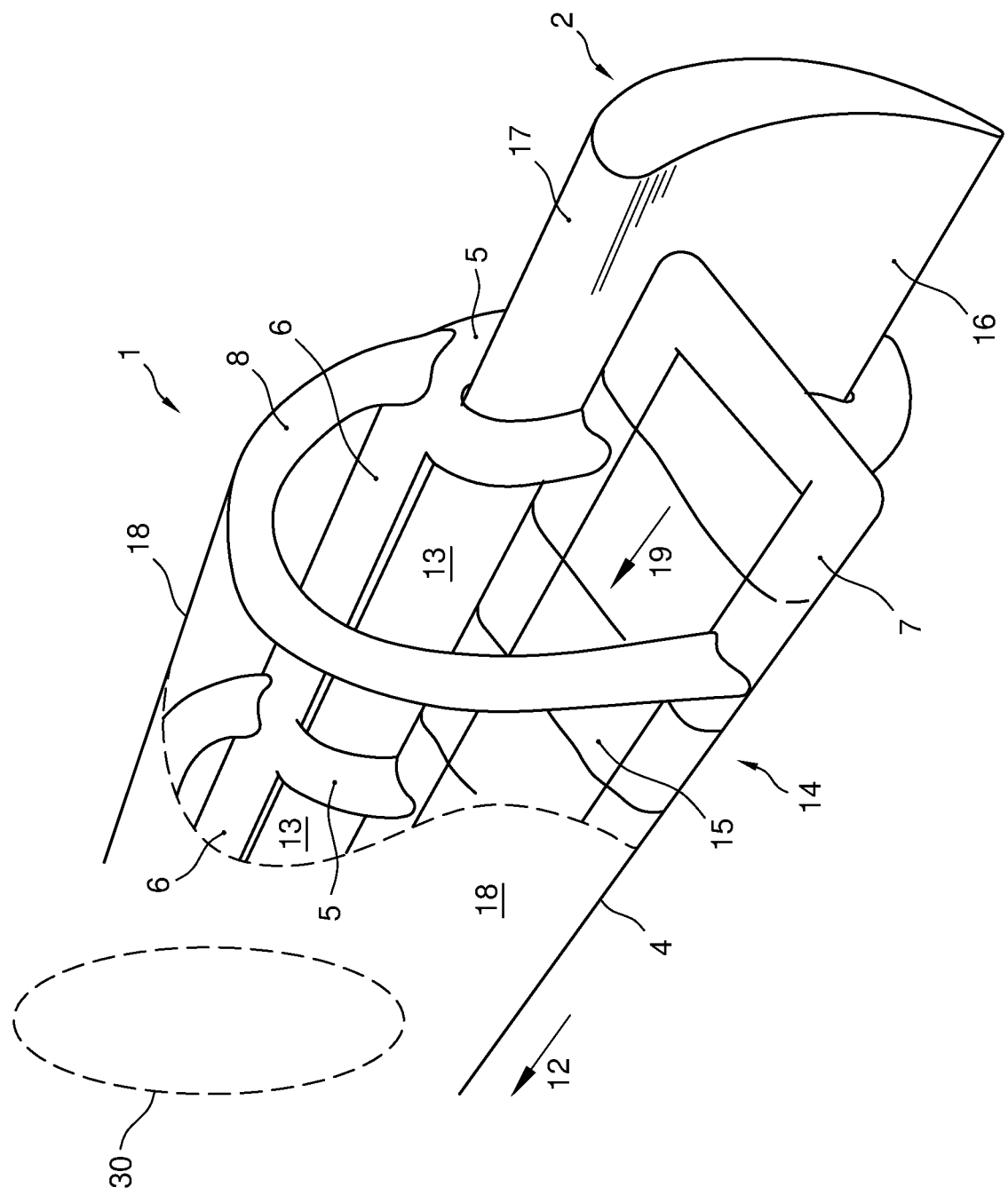
FIG. 2 shows a partial perspective view of a section of the blade with the device in the inflated state.

An exemplary device 1 for forming a temporary support structure 14 for maintenance crew for a blade 2 of a wind turbine 3 is shown in FIGS. 1B-C. FIG. 2 shows an enlarged view of part of the device 1 on the blade 2. The device 1 comprises a sleeve 4 configured to surround the blade 2, at least a longitudinal section thereof, wherein the sleeve 4 comprises at least one inflatable part 5-8 (see FIG. 2) which is changeable between a deflated state (see FIG. 1B) and an inflated state (see FIGS. 1C and 2) when the sleeve 4 surrounds the blade 2. In FIG. 1C the blades have been rotated by about 90 degrees compared to FIGS. 1A and 1B to bring the blade 2 with the device 1 from a downwardly directed orientation to a substantially horizontal orientation.

In the deflated state, the sleeve 4 is movable with respect to the blade 2 for positioning the sleeve 4 with respect to the blade 2. In the inflated state, the sleeve 4 is configured to clamp the sleeve 4 with respect to the blade 2.

At least in the inflated state, the sleeve 4 is configured to form a support structure 14 along the blade 2 for supporting maintenance crew for the blade 2 thereon.

The wind turbine 3 itself (i.e. without the device 1) is here of a conventional type, wherein three blades 2 extend from a central nacelle 9 which is provided on top of a tower 10. It will be appreciated that a wind turbine can be configured differently from the shown example, e.g. having another number of blades.

The shown wind turbine 3 is an offshore wind turbine 3 and is provided with a base platform 11 at a base of the tower 10. The base platform 11 can support maintenance crew at the base of the tower 10. Maintenance crew can for example access the base platform 11 from a transport vessel (not shown). From the base platform 11, crew can enter the tower 10 e.g. to reach the nacelle 9.

Figure 3:
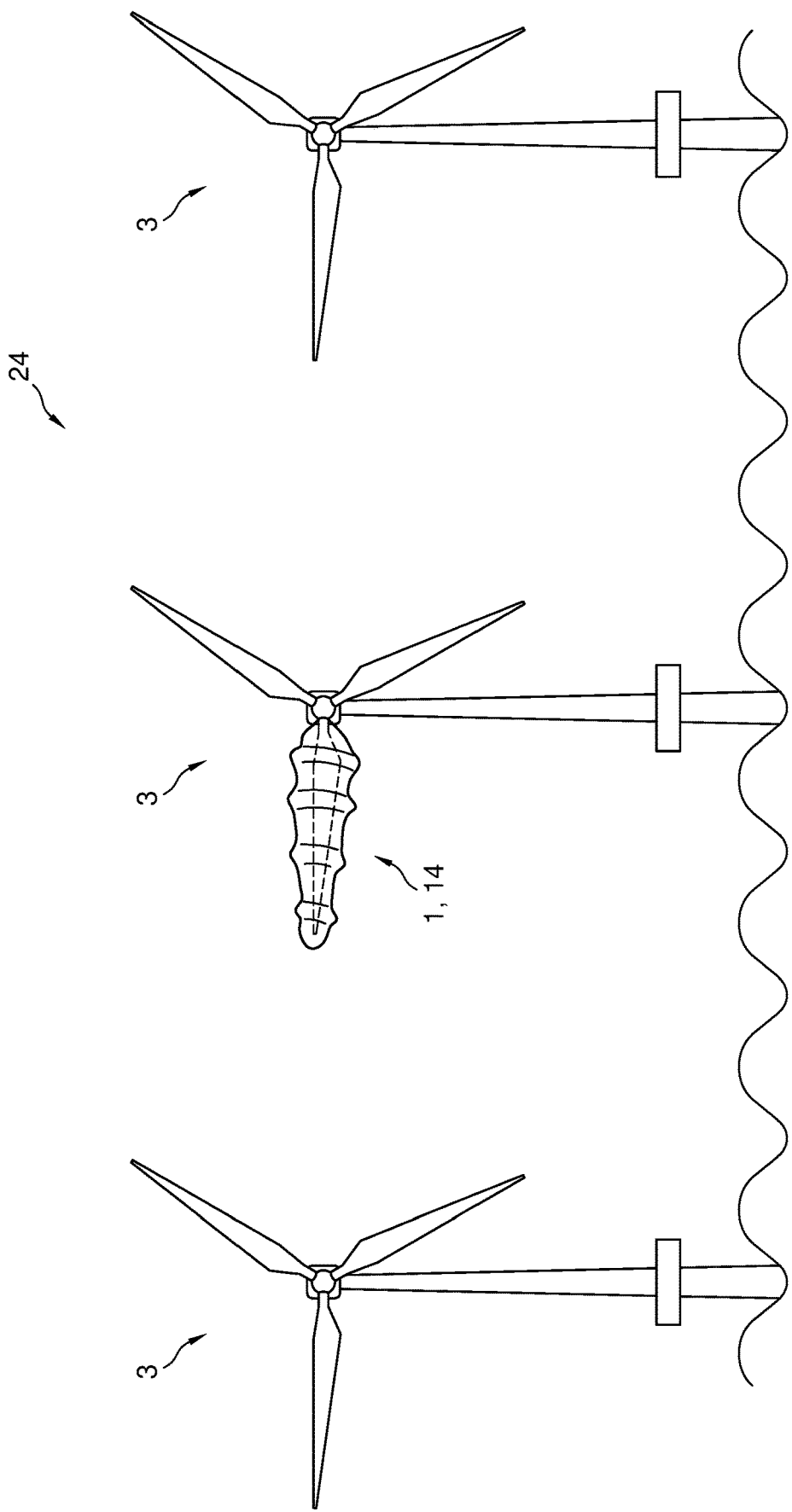
FIG. 3 shows a front view of an exemplary wind park which includes the wind turbine of FIG. 1C.

The wind turbine 3 may be arranged as part of a wind turbine park 24 such as an offshore wind turbine park as shown in FIG. 3, for example along with similar wind turbines 3 in the park 24. While FIG. 3 only shows three wind turbines 3, a wind turbine park 24 can have any plural number of wind turbines.

Here, the at least one inflatable 5-8 part comprises at least one inflatable rib part 5-8 (see FIG. 2) which is configured to stiffen the sleeve 4, at least a section thereof, when inflated. The inflatable rib parts 5-8 are preferably interconnected to form one joint inflatable rib structure 5-8, as shown. Alternatively, for example, two or more separately inflatable rib structures may be provided, each comprising one or more inflatable parts of the at least one inflatable part.

Here, the at least one inflatable part 5-8 comprises a series of inflatable rings 5 which are each configured to surround the blade 2 and to clamp the blade 2 when inflated. Here, the inflatable rings 5 are distributed along a longitudinal direction 12 in which the blade 2 extends. Here, the inflatable rings 5 are arranged with mutual interspacing along the sleeve 4, in particular along the longitudinal direction 12, to expose one or more sections 13 of the blade 2 between the rings 5 for maintenance of said one or more sections 13.

In FIG. 2 the rings 5 can be seen as essentially conforming to a circumferential shape of the blade 2 at the position of the respective ring 5. The rings 5 are configured, in particular dimensioned, such that clamping between the ring 5 and the blade 2 occurs when they are inflated while being received on the blade 2 at a respective ring position. Such clamping inhibits mutual movement of the rings 5 and the blade 2, and thereby contributes to stability of the supporting structure 14.

Here, the rings 5 are respectively dimensioned in accordance with a respective dimension of the blade 2 at a predetermined operational position of the ring 5 along the blade 2. For example, a circumference of the blade 2 may decrease along the longitudinal direction 12, i.e. as a distance from the nacelle 9 increases, wherein respective circumferences of the rings 5 accordingly decrease along the sleeve 4 to provide a snug clamping fit at each ring 5.

Here, the at least one inflatable part 5-8 further comprises at least one inflatable connecting part 6 which is configured to expand and/or stiffen a section of the sleeve 4 which section mutually connects at least two adjacent inflatable rings 5.

Preferably, as shown, the sleeve 4 is configured to provide the support structure 14 when the blade 2 extends substantially horizontally (see FIGS. 1C and 2). Here, the support structure 14 is configured to enable the maintenance crew to move, for example walk and/or crawl, thereon with respect to the blade 2, in particular along a longitudinal direction 12 in which the blade 2 extends. Here, the support structure 14 provided by the device 1 comprises a platform 15 for the maintenance crew which platform 15 extends along the blade 2, in particular along a longitudinal direction 12 of the blade 2. The platform 15 here is provided in the form of a walkway for the crew. One 7 of the inflatable parts 5-8 here extends along a circumference of the platform 15 to substantially stiffen the platform 15.

Here, the platform 5 extends at an angle to a face 16 of the blade 2, in particular at a distance from a leading edge 17 of the blade 2.

Here the support structure 14 comprises a barrier 18 to provide fall protection for the maintenance crew on the support structure 14. The barrier 18 here is formed by a section of the sleeve which section essentially spans the platform 15. Here some 8 of the inflatable parts 5-8 are arranged along the barrier 18, for example one 8 at each ring 5 position, to stiffen the barrier 18 and to space the barrier 18 apart from the platform 15, thereby allowing crew to move relatively easily between along the platform 15 while being protected by the barrier 18.

Here, the support structure 14 is configured to provide an enclosure for the maintenance crew, in particular an enclosure within the sleeve 4 and/or an enclosure between the sleeve 4 and the blade 2. In the example of FIG. 2, the enclosure is mainly formed by the platform 15 and the barrier 18 and to some extent by the rings 5 and exposed sections 13 of the blade 2.

During use, preferably at least a section 13 of the blade 2 is exposed within the enclosure for maintenance of the at least section 13 of the blade 2 from within the enclosure.

Here, the support structure 14 is configured to provide an entrance 19 into the enclosure for the maintenance crew, in particular an entrance 19 in the longitudinal direction 12 from a proximal section or end of the blade 2.

In FIG. 2, the sleeve 4 can be seen to thus comprise a first sleeve channel and a second sleeve channel substantially parallel to each other, wherein the first sleeve channel (here formed by the series of rings 5) is configured to receive at least a section of the blade 2 therein, wherein the second sleeve channel (the enclosure formed between platform 15 and barrier 18) is configured to receive the maintenance crew therein.

The present sleeve 4 provides at least one window between the first and second sleeve channels (between rings 5, connecting part 6 and platform 15) to enable maintenance on the blade 2 which is received in the first sleeve channel from within the second sleeve channel, in particular maintenance of one or more sections 13 of a leading edge 17 of said blade 2.

The first and second sleeve channels here have respective proximal entrances, for example substantially adjacent to each other. Said proximal entrances here comprise an entrance 19 into the enclosure for the crew and an entrance for the blade 2 formed by a most proximal one of the rings 5.

With reference to FIGS. 1B-C, the exemplary sleeve 4 has a constricted and/or closed distal end 20 which is configured to receive a tip of the blade 2 therein. While the shown sleeve 4 is provided with a closed distal end 20, alternatively or additionally the sleeve 4 may have an open distal end.

The device 2 may further comprise anchoring means 21 such as anchoring wires 21 for anchoring the sleeve 4, in particular a proximal end of the sleeve 4, with respect to the blade 2, for example anchoring to a proximal section or end of the blade 2 and/or to a nacelle 9 from which the blade 2 extends.

FIG. 1A shows an exemplary system for forming a temporary support structure 14 for maintenance crew for a blade 2 of a wind turbine 3. The system comprises a device 1 as described and positioning means 22, 23 for positioning the sleeve 4 of said device 1 with respect to the blade 2, in particular when the sleeve 4 is in the deflated state.

The positioning means 22, 23 may comprise hoisting means 22, 23, for example including a hoist wire 22, for hoisting the sleeve 4 with respect to the blade 2. The hoisting means may comprise an aerial vehicle such as an unmanned aerial vehicle (UAV) 23 for positioning a hoist wire 22 for hoisting the sleeve 4.

Preferably, the system further comprising inflating means (not shown), for example a pump, for inflating the sleeve 4 on the blade 2.

Preferably, the system further comprises monitoring means (not shown) for monitoring the inflated state of the sleeve 4, in particular for monitoring whether the sleeve 4 is sufficiently inflated and/or whether a leak may be present in the at least one inflatable part 5-8.

The system may comprise a guiding means for guiding the sleeve 4 and the blade 2 with respect to each other to receive the blade 2 in the sleeve 4. In particular such guiding means may facilitate an appropriate opening of a blade receiving part (e.g. a ring 5) of the sleeve 4 when the device 1 is hoisted to engage the blade 2.

In one example, the guiding means comprises one or more further ring structures 30, for example along and/or adjacent one or more of the inflatable rings 5. Such one or more further ring structures can be configured to provide the aforementioned appropriate opening. To that end, the one or more further ring structures preferably have a relatively large internal dimension, e.g. diameter, compared to a respective outer dimension, e.g. width, of the blade. The one or more further ring structures can comprise one or more hoops and/or spirals which are relatively rigid, at least in a direction transverse to the longitudinal direction 12. Alternatively or additionally, the one or more further ring structures may be inflatable to cause a stiffening and/or widened opening thereof, in particular separately inflatable from the aforementioned at least one inflatable part 5-8. During use, such an inflatable further ring structure can then be inflated before and/or during hoisting of the sleeve 4 onto the blade 2, to guide the blade 2 into the sleeve 4 through the inflated further ring structure. Once the sleeve 4 is received on the blade 2, the inflatable further ring structure can then be deflated, e.g. before and/or during inflation of the at least one inflatable part 5-8 (including the inflatable rings 5 that can clamp the blade 2). Thus, while the rings 5 of the at least one inflatable part 5 are preferably configured to cause a clamping between sleeve 4 and blade 2 by their inflation, the inflatable further ring structure of the guiding means is preferably configured rather to inhibit friction between sleeve 4 and blade 2, i.e. a substantially opposite function which is used in a different phase of use.

With reference to FIGS. 1A-C, an exemplary method of forming a temporary support structure 14 for maintenance crew for a blade 2 of a wind turbine 3 comprises: providing a device 1 as described herein; positioning the sleeve 4 to surround at least a section of the blade 2 (see FIG. 1B); and inflating the at least one inflatable part 5-8 (see FIG. 1C), thereby clamping the sleeve 4 with respect to the blade 2 (see also FIG. 2).

Preferably the method further comprises bringing the blade 2 to a substantially horizontal position (FIGS. 1C and 2), for example from a more downwardly directed position (FIGS. 1A-B), in particular after positioning the sleeve 4 to surround at least a section of the blade 2, for example before (alternatively after and/or during) inflating the at least one inflatable part 5-8.

The method may further comprise anchoring the sleeve 4, in particular a proximal end thereof, with respect to the blade 2, for example anchoring to a proximal section or end of the blade 2 and/or to a nacelle 9 from which the blade 2 extends. In FIGS. 1B and 1C a proximal end of the sleeve 4 can be seen thus anchored using anchoring wires 21.

The method may comprise the following subsequent steps: the blade 2 on which maintenance is to be performed is brought to a downwardly directed vertical orientation as shown in FIG. 1A; one end of a hoisting rope 22 is brought to the nacelle 9 while another end thereof is retained at the base platform 11; using the hoisting rope 22, the sleeve 4 of the device 1 is hoisted to surround the blade 2 (FIG. 1B); the sleeve 4 is anchored, e.g. at the nacelle 9; the blade 2 with the device 1 thereon is rotated to a substantially horizontal orientation; and the sleeve 4 is inflated (FIG. 1C) to establish clamping and preferably stiffening. Thereafter, the device 1 is ready to receive maintenance crew for the blade 2. The maintenance crew can for example access the device 1 from the nacelle 9.

An exemplary method of performing maintenance on a blade 2 of a wind turbine 3 thus comprises: forming a temporary support structure 14 at the blade 3 as described, in particular using a device 1 and/or a system as described; and performing maintenance on the blade 2 from the formed support structure 14.

The temporary support structure 14 may be removed from the blade 2 after maintenance has been performed, wherein the removing in particular comprises deflating the sleeve 4, thereby releasing the clamping of the sleeve 4 with respect to the blade 2. After the deflating, the device 1 may be hoisted down away from the blade 2, e.g. onto the base platform 11 and/or onto a vessel.

It will be appreciated that maintenance may thus be performed on multiple blades 2 of a same wind turbine 3 and/or of different wind turbines 3, wherein one or more of such devices 1 can be used, subsequently and/or simultaneously. For example, in a single wind turbine 3, maintenance may be subsequently performed on subsequent blades 2 using a same device 1, wherein between performing maintenance on the subsequent blades 2 the device is deflated, then moved from one blade 2 to a subsequent blade 2, and then re-inflated. Alternatively, for example, each blade 2 may be provided with a respective inflated device 1, wherein a blade 2 is moved to a respective horizontal position when maintenance crew is ready to progress to the respective blade 2. In case of a wind turbine with four blades, for example, two blades can be in a horizontal position simultaneously, so that maintenance can be performed on those blades simultaneously if desired, when each of said blades is provided with a respective inflated device.

FIGS. 1B-C and 2 show an exemplary wind turbine blade 2 provided with a device 1 and/or a system as described and/or maintained by a method as described. FIGS. 1B-C also show an exemplary wind turbine 3, in particular an offshore wind turbine 3, comprising such a wind turbine blade 2.

FIG. 3 shows an example of a wind turbine park 24, in particular an offshore wind turbine park 24, comprising a plurality of wind turbines 3, said plurality including at least one wind turbine 3 provided with a device 1. It will be appreciated that multiple wind turbines 3 in a park 24 can be provided with a respective device 1 at the same time.

Maintenance on a wide variety of wind turbine blades 2 can thus be performed safely and efficiently.

Figure 4:
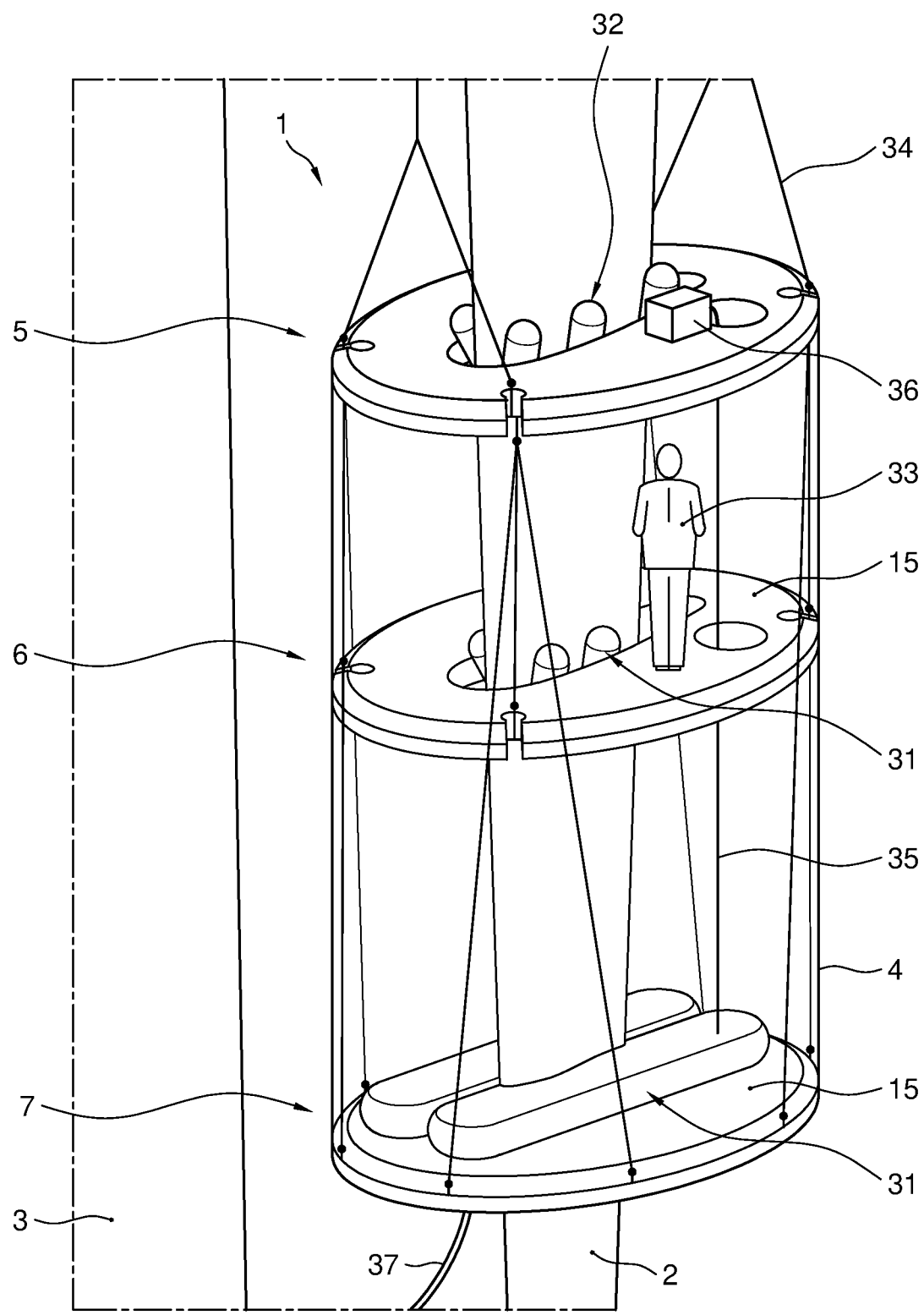
FIG. 4 shows a perspective view of another exemplary device for forming a temporary support structure.

FIG. 4 shows a perspective view of another exemplary device 1 for forming a temporary support structure. Here, the sleeve 4 is configured to provide the support structure when the blade 2 of the wind turbine 3 extends substantially vertically, preferably from the nacelle downwardly. The sleeve 4 forms a 360 degrees enclosement or enclosure surrounding a working space for a maintenance crew 33. Again, the sleeve 4 includes inflatable parts or structures comprising a series of inflatable rings 5-7 which are each configured to surround the blade 2 and to clamp the blade 2 when inflated. In the shown The inflatable rings 5-7, in particular an upper surface thereof, further serve as a respective number of platforms 15 arranged in parallel with each other and substantially transverse to the blade 2. In the shown embodiment, three platforms 15 are shown. In principle, more platforms could be provided, e.g. four, five or six platforms or more than six platforms. Also, less than three platforms could be provided, e.g. two platforms or a single platform. In the shown embodiment, the inflatable rings 5-7 are provided, at a portion adjacent to the blade 2, with clamping cushions, exerting a clamping force on the blade 2, so as to provide a closed, safe working platform. Further, in the shown embodiment, the inflatable rings 5-7, especially the uppermost ring 5, may be provided with a water-tight seal sealing against the tip so as to provide a dry working space for a maintenance crew 33. The device is connected, using hoist cables 34, to a hoisting device of the wind turbine 3 so as to keep the device 1 stationary, at a fixed vertical level, with respect to the blade 2. In the shown embodiment, the platforms 15 may be movable relative to each other. In particular, an intermediate platform formed by an intermediate ring 6 may be movable upwardly or downwardly, using a hoisting cable 35 defining an intermediate distance between subsequent platforms 15. To that end, the device 1 may include a hoisting unit 36 arranged to adjust a length of the hoisting cable 35 by lowering or winding said hoisting cable 35. Also an umbilical or feeding line 37 for power and/or air pressure may be provided between the device 1 and the wind turbine 3.

By providing a support structure that extends substantially vertically, a climatized working space can be realized, e.g. having a controlled environment having e.g. a humidity of more than 70% and/or a temperature higher than circa 10 degrees Celsius. The support structure can be mounted relatively quickly, e.g. in less than circa one hour, and can be mounted without using a vessel crane. No turning gear is required. Further, a mounting process is less dependent on weather circumstances thus effectively increasing a repair season. The device can be placed or parked on a temporary platform on the wind turbine, as described in more detail below. Also, repair operations can be carried out having improved performance in terms of quantity and/or quality. In principle, the complete blade can be reached by a maintenance crew, from the tip and upwardly towards the nacelle.

Figure 5A:
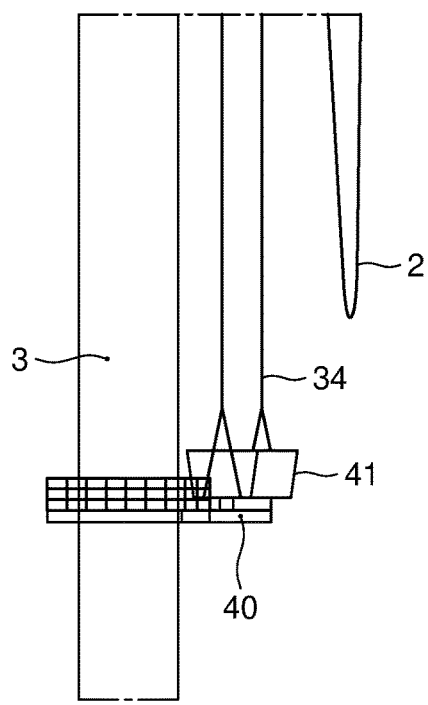
FIG. 5a shows a side view of a wind turbine with yet another exemplary device for forming a temporary support structure in a first state.
Figure 5B:
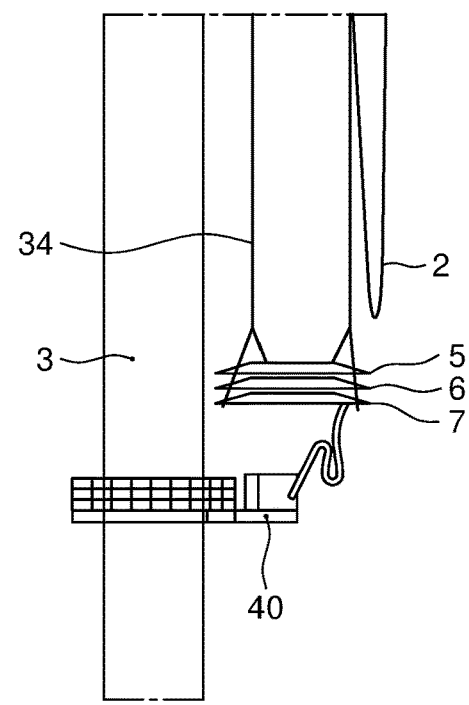
FIG. 5b shows a side view of the wind turbine of FIG. 5a wherein the yet another exemplary device is in a second state.
Figure 5C:
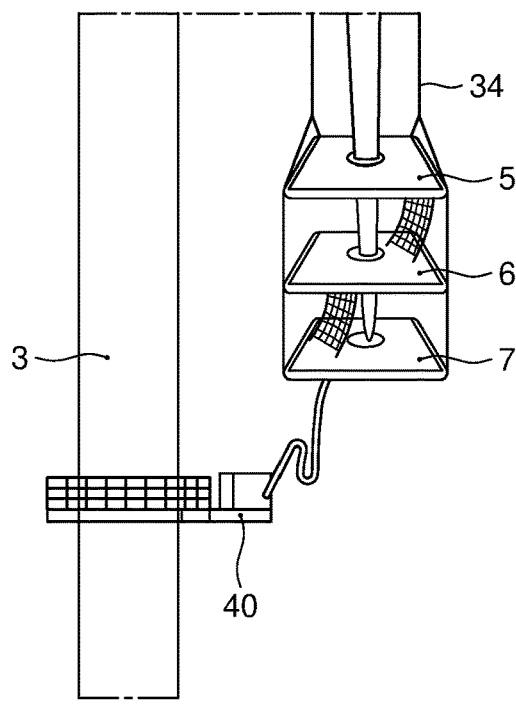
FIG. 5c shows a side view of the wind turbine of FIG. 5a wherein the yet another exemplary device is in a third state.
Figure 5D:
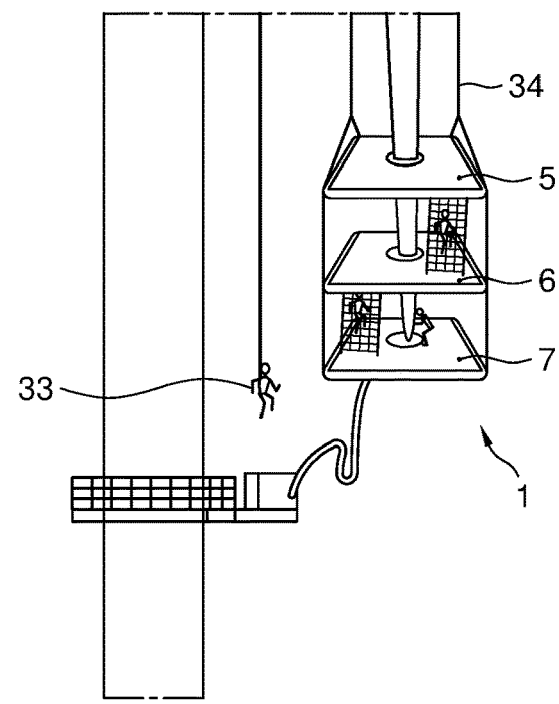
FIG. 5d shows a side view of the wind turbine of FIG. 5a wherein the yet another exemplary device is in a fourth state.

FIG. 5a-d show respective side views of a wind turbine with yet another exemplary device 1 for forming a temporary support structure in a first, second, third and fourth state. Here, the device 1 is packed in a bigbag or another portable structure 41 and lifted to a platform 40 of the wind turbine 3. Assembling persons may climb up to the nacelle of the wind turbine 3 to drop down ropes serving as hoisting cables 34. Lower ends of the hoisting cables 34 are connected to the device 1 packed as a tent in the bigbag 41, as shown in FIG. 5a, in the first state. Then, the tent is lifted using the hoisting cables 34 and the inflatable rings 5-7 are inflated while in mid-air position, as shown in FIG. 5b, in the second state. Subsequently, in the third state, as shown in FIG. 5c, the tent is positioned around the mainly vertically oriented blade 2 of the wind turbine 3, and lifted over and along the blade 2. In principle, the tent can be folded out by lifting respective platforms upwardly and/or by lowering respective platforms downwardly. Then, in the fourth state, as shown in FIG. 5d, the tent or temporary support structure 1 is accessible for maintenance crew, e.g. circa 1-3 workers, either from above or from aside. If desired access from one platform to another can be realized using flexible and/or foldable stairs or ladder. The temporary support structure can be removed in a similar way, in reverse order.

Figure 6:
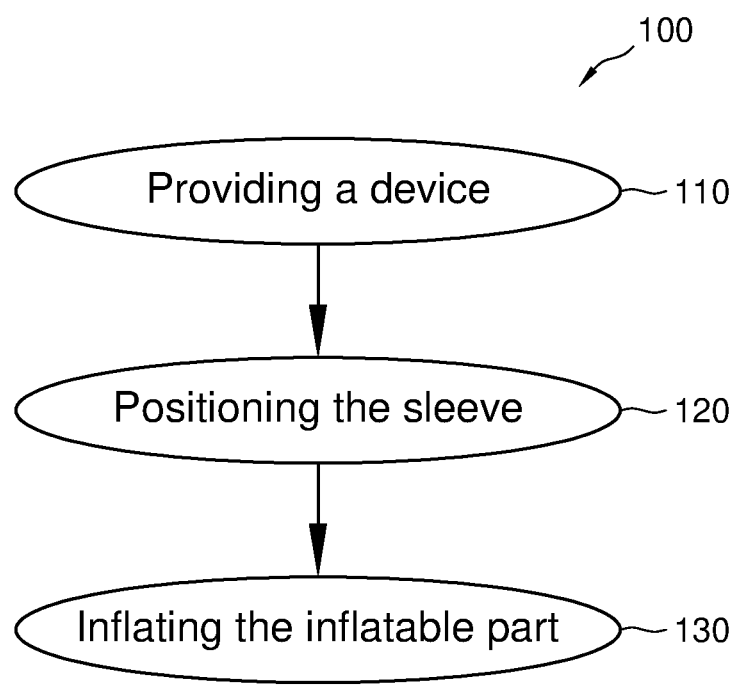
FIG. 6 shows a flow chart of a method of forming a temporary support structure according to the invention.

FIG. 6 shows a flow chart of a method 100 of forming a temporary support structure according to the invention. The temporary support structure can be used for maintenance crew for a blade of a wind turbine. The method 100 comprises a step of providing 110 a device 1 for forming a temporary support structure, a step of positioning 120 the sleeve to surround at least a section of the blade, and a step of inflating 130 the at least one inflatable part, thereby clamping the sleeve with respect to the blade. While the invention has been described with reference to exemplary embodiments and drawings, these are not to be interpreted as limiting the invention as defined by the claims. Many variations, combinations and extensions are possible, as will be appreciated by the skilled person. Examples thereof have been provided throughout the description.

The invention claimed is:

1. A device for forming a temporary support structure for maintenance crew for a blade of a wind turbine,
the device comprising a sleeve configured to surround the blade, at least a longitudinal section thereof, wherein the sleeve comprises at least one inflatable part which is changeable between a deflated state and an inflated state when the sleeve surrounds the blade,
wherein in the deflated state the sleeve is movable with respect to the blade for positioning the sleeve with respect to the blade, wherein in the inflated state the sleeve is configured to clamp the device with respect to the blade,
wherein, at least in the inflated state, the sleeve is configured to form a support structure along the blade for supporting maintenance crew for the blade thereon, and
wherein the at least one inflatable part comprises a series of inflatable rings which are each configured to surround the blade and to clamp the blade when inflated.

2. The device according to claim 1, wherein the at least one inflatable part comprises at least one inflatable rib part which is configured to stiffen the sleeve, at least a section thereof, when inflated.

3. The device according to claim 1, wherein the inflatable rings are distributed along a longitudinal direction in which the blade extends.

4. The device according to claim 3, wherein the inflatable rings are arranged with mutual interspacing along the sleeve to expose one or more sections of the blade between the rings for maintenance of said one or more sections.

5. The device according to claim 1, wherein the at least one inflatable part comprises at least one inflatable connecting part which is configured to expand and/or stiffen a section of the sleeve which section mutually connects at least two adjacent inflatable rings.

6. The device according to claim 1, wherein the rings are respectively dimensioned in accordance with a respective dimension of the blade at a predetermined operational position of the ring along the blade.

7. The device according to claim 1, wherein the support structure comprises a platform for the maintenance crew which platform extends substantially along or transverse to the blade.

8. The device according to claim 7, wherein the platform extends at an angle to a face of the blade, or wherein the support structure comprises a multiple number of platforms arranged in parallel with each other and substantially transverse to the blade.

9. The device according to claim 1, wherein the support structure comprises a barrier to provide fall protection for the maintenance crew on the support structure.

10. The device according to claim 1, wherein the support structure is configured to provide an enclosure for the maintenance crew, said enclosure being within the sleeve and/or between the sleeve and the blade,
wherein during use at least a section of the blade is exposed within the enclosure for maintenance of the at least section of the blade from within the enclosure.

11. The device according to claim 1, wherein the support structure is configured to enable the maintenance crew to move thereon with respect to the blade, along a longitudinal direction in which the blade extends.

12. The device according to claim 1, wherein the sleeve has a constricted and/or closed distal end which is configured to receive a tip of the blade therein.

13. The device according to claim 1, further comprising an anchor for anchoring the sleeve with respect to the blade.

14. The device according to claim 1, wherein the sleeve is configured to provide the support structure when the blade extends substantially horizontally or substantially vertically.

15. A system for forming a temporary support structure for maintenance crew for a blade of a wind turbine, the system comprising a device according to claim 1 and configured for positioning the sleeve of said device with respect to the blade, when the sleeve is in the deflated state.

16. The system according to claim 15, wherein the positioning includes hoisting the sleeve with respect to the blade.

17. The system according to claim 15, further configured for monitoring an inflated state of the sleeve, to determine whether the sleeve is sufficiently inflated and/or whether a leak may be present in the at least one inflatable part.

18. The system according to claim 15, further configured for guiding the sleeve and the blade with respect to each other to receive the blade in the sleeve.

19. A device for forming a temporary support structure for maintenance crew for a blade of a wind turbine,
the device comprising a sleeve configured to surround the blade, at least a longitudinal section thereof, wherein the sleeve comprises at least one inflatable part which is changeable between a deflated state and an inflated state when the sleeve surrounds the blade,
wherein in the deflated state the sleeve is movable with respect to the blade for positioning the sleeve with respect to the blade, wherein in the inflated state the sleeve is configured to clamp the device with respect to the blade, wherein, at least in the inflated state, the sleeve is configured to form a support structure along the blade for supporting maintenance crew for the blade thereon, wherein the sleeve comprises a first sleeve channel and a second sleeve channel substantially parallel to each other, wherein the first sleeve channel is configured to receive at least a section of the blade therein, wherein the second sleeve channel is configured to receive the maintenance crew therein, wherein the sleeve provides at least one window between the first and second sleeve channels to enable maintenance on the blade which is received in the first sleeve channel from within the second sleeve channel, and wherein the first and second sleeve channels have respective proximal entrances substantially adjacent to each other.

20. The device according to claim 19, wherein the at least one inflatable part comprises at least one inflatable rib part which is configured to stiffen the sleeve, at least a section thereof, when inflated.

* * * * *